United States Patent
Bailey et al.

(10) Patent No.: US 9,752,887 B2
(45) Date of Patent: Sep. 5, 2017

(54) NAVIGATION SYSTEM HAVING CONTEXT ENABLED NAVIGATION MECHANISM AND METHOD OF OPERATION THEREOF

(71) Applicant: TeleNav, Inc., Sunnyvale, CA (US)

(72) Inventors: Kevin Bailey, Alameda, CA (US); Loren Hillberg, Atherton, CA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 13/655,323

(22) Filed: Oct. 18, 2012

(65) Prior Publication Data
US 2014/0115507 A1    Apr. 24, 2014

(51) Int. Cl.
*G06F 3/00* (2006.01)
*G01C 21/36* (2006.01)

(52) U.S. Cl.
CPC ..... *G01C 21/3602* (2013.01); *G01C 21/3697* (2013.01)

(58) Field of Classification Search
CPC .. B60W 10/06; B60W 20/00; B60W 2540/10; B60W 2540/30; B60W 30/182; B60W 10/02; B60W 10/08; B60W 10/10; B60W 2710/105; B60W 2720/106; B60W 30/19; B60W 10/11; B60W 2050/0078; B60W 2050/008
USPC .................. 455/456.1, 418, 404.2
See application file for complete search history.

(56) References Cited

U.S. PATENT DOCUMENTS

| | | |
|---|---|---|
| 5,285,523 A | 2/1994 | Takahashi |
| 5,475,492 A | 12/1995 | Yukawa |
| 6,449,535 B1 | 9/2002 | Obradovich et al. |
| 6,580,973 B2 | 6/2003 | Leivian et al. |
| 6,731,925 B2 | 5/2004 | Naboulsi |
| 7,009,488 B2 | 3/2006 | Schwartz et al. |
| 7,050,976 B1 | 5/2006 | Packingham |
| 7,139,738 B2 | 11/2006 | Philomin et al. |
| 7,552,004 B2 | 6/2009 | Brikho |
| 7,769,513 B2 | 8/2010 | Breed et al. |
| 8,106,783 B2 | 1/2012 | Wada et al. |
| 2003/0169181 A1* | 9/2003 | Taylor ................. 340/902 |
| 2005/0170850 A1 | 8/2005 | Edwards et al. |
| 2007/0026850 A1* | 2/2007 | Keohane et al. ......... 455/418 |
| 2007/0050130 A1* | 3/2007 | Grimm et al. .......... 701/208 |
| 2007/0158128 A1 | 7/2007 | Gratz et al. |
| 2007/0273492 A1* | 11/2007 | Hara ............... B60W 50/06 340/438 |
| 2010/0316255 A1* | 12/2010 | Mathony et al. ........ 382/103 |

(Continued)

FOREIGN PATENT DOCUMENTS

WO    WO 2006116240 A2 * 11/2006

OTHER PUBLICATIONS

Colbry et al., "Detection of Anchor Points for 3D Face Verification", "Department of Computer Science and Engineering", , Publisher: Michigan State University, Published in: East Lansing, Michigan.

(Continued)

*Primary Examiner* — Di Xiao
(74) *Attorney, Agent, or Firm* — IP Investment Law Group

(57) ABSTRACT

A method of operation of a navigation system includes: receiving a surrounding indicator; comparing a past indicator to the surrounding indicator for recognizing a driving environment; and varying a selectability of a functionality based on the past indicator compared for displaying on a device.

20 Claims, 5 Drawing Sheets

(56) References Cited

U.S. PATENT DOCUMENTS

2011/0153199 A1* 6/2011 Morimoto .......... G01C 21/3697
 701/533
2013/0035117 A1* 2/2013 Litkouhi et al. ........... 455/456.4
2013/0085655 A1* 4/2013 Kii et al. ...................... 701/103
2013/0124207 A1* 5/2013 Sarin ....................... G10L 15/22
 704/275

OTHER PUBLICATIONS

Liebe et al., "Analyzing Appearance and Contour Based Methods for Object Categorization", "Conference on Computer Vision and Pattern Recognition", Jun. 2003, pp. 1-7, Publisher: IEEE, Published in: Madison, USA.

Sjolander, "SRIS—Sllippery Road Information System", Dec. 2008, Publisher: Intelligent Vehicle Safety Systems (IVISS), Published in: Sweden.

\* cited by examiner

NAVIGATION SYSTEM HAVING CONTEXT ENABLED NAVIGATION MECHANISM AND METHOD OF OPERATION THEREOF

TECHNICAL FIELD

The present invention relates generally to a navigation system, and more particularly to a system for navigation system having context enabled navigation mechanism.

BACKGROUND ART

Modern portable consumer and industrial electronics, especially client devices such as navigation systems, cellular phones, portable digital assistants, and combination devices are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system that cannot reduce the distraction from operating the navigation system based on the surrounding environment has become a paramount concern for the consumer. A navigation system that cannot deter the user from manipulating the navigation system while operating the vehicle in an environment that requires extra care can lead to unsafe operation of the vehicle and can decrease the benefit of using the tool.

Thus, a need still remains for a navigation system having context enabled navigation mechanism to limit the accessibility to the functionalities of the navigation system while operating the vehicle in an environment that requires extra care. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving a surrounding indicator; comparing a past indicator to the surrounding indicator for recognizing a driving environment; and varying a selectability of a functionality based on the past indicator compared for displaying on a device.

The present invention provides a navigation system, including: a sensor receiver module for receiving a surrounding indicator; a context analyzer module, coupled to the sensor receiver module, for comparing a past indicator to the surrounding indicator for recognizing a driving environment; and a display module, coupled to the sensor receiver module, for varying a selectability of a functionality based on the past indicator compared for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
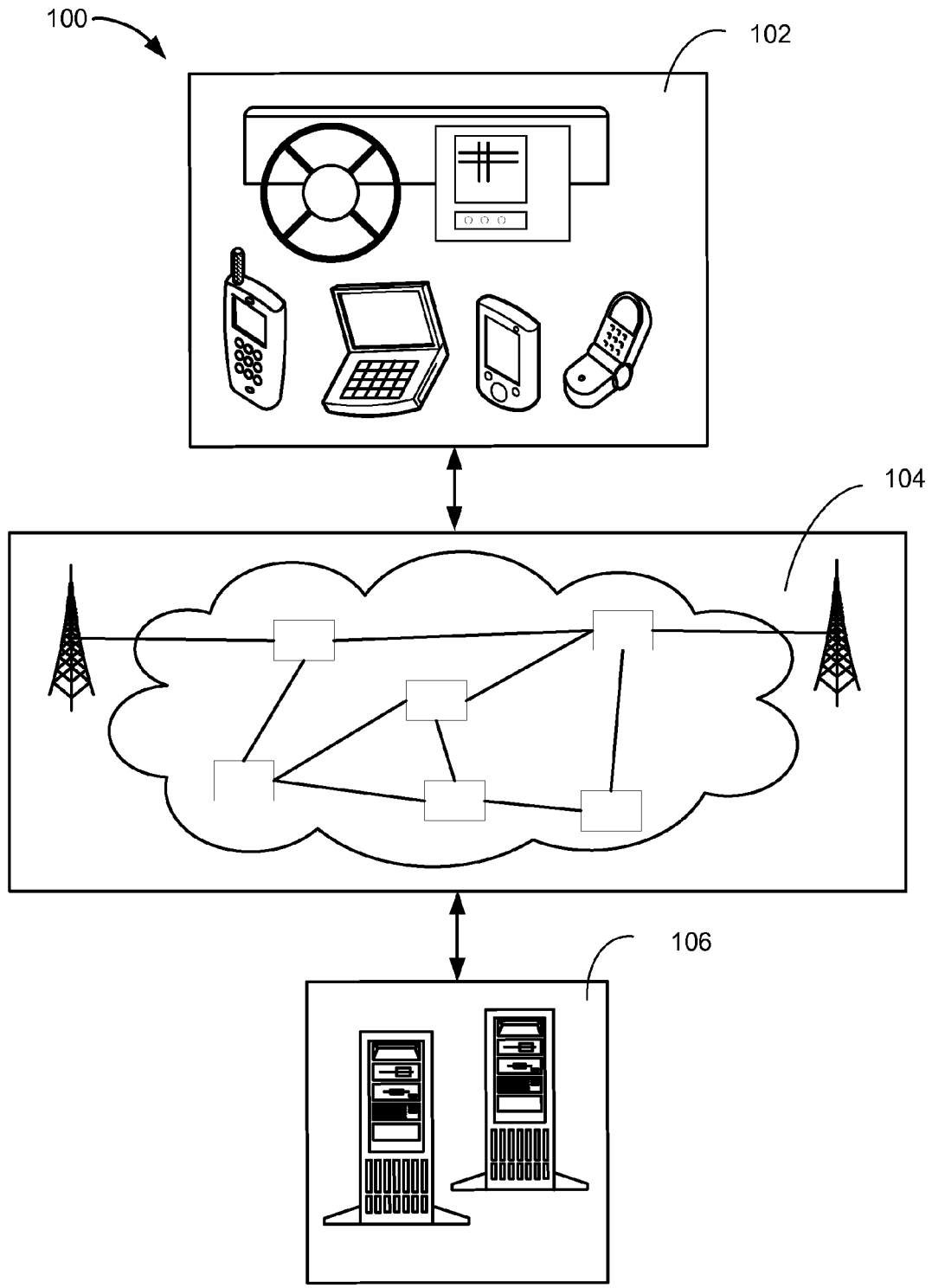
FIG. 1 is a navigation system having context enabled navigation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element comprising a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 having context enabled navigation mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
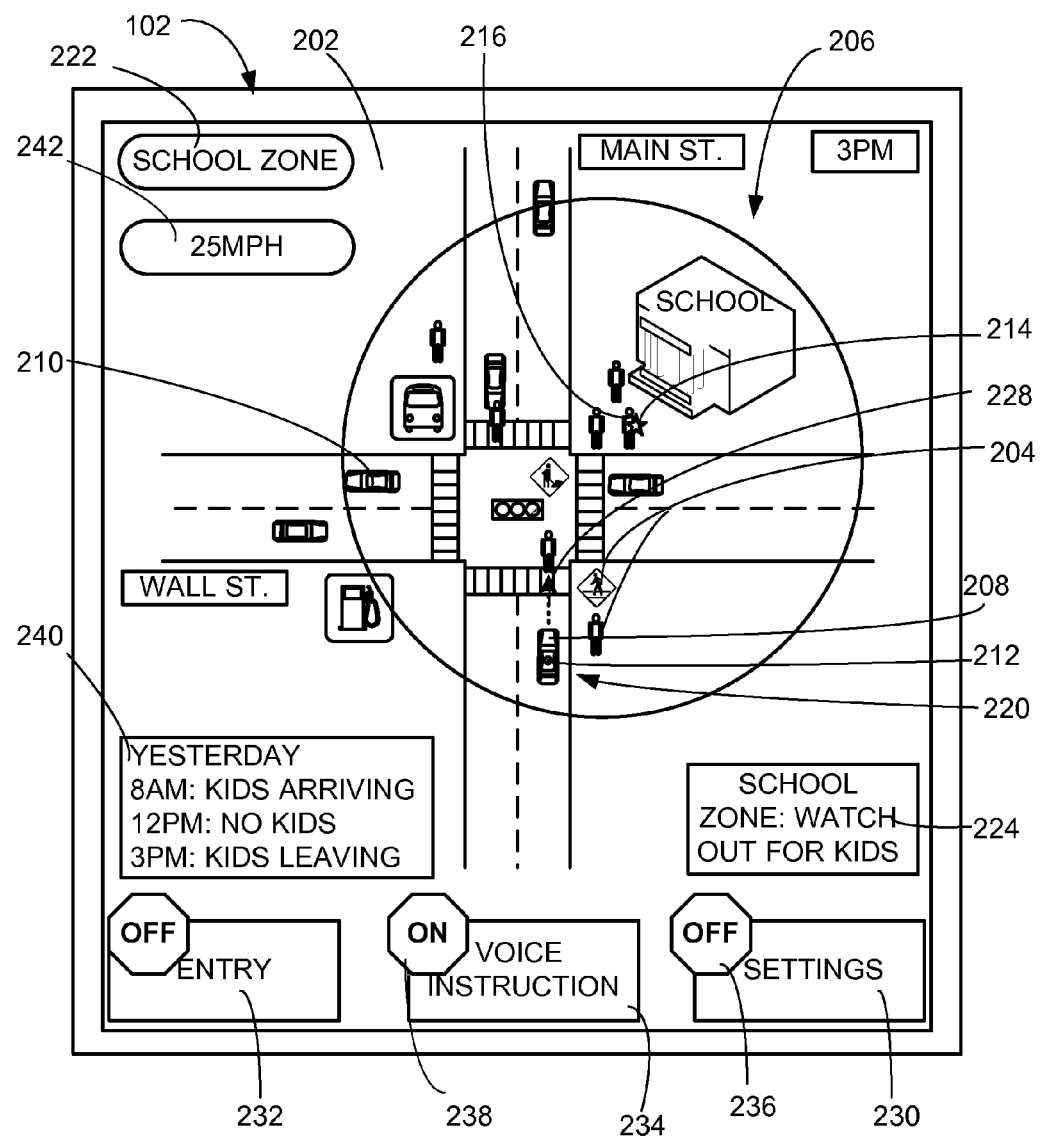
FIG. 2 shows an example of a display on a display interface of the first device.

Referring now to FIG. 2, therein is shown an example of a display on a display interface 202 of the first device 102. A surrounding indicator 204 is defined as environmental information that surrounds a user's vehicle 208 while the user is operating the vehicle. The user's vehicle 208 is defined as the vehicle operated by the user. For example, the surrounding indicator 204 can be from the outside, the inside, or the combination thereof of the user's vehicle 208.

As an example, the surrounding indicator 204 can include a child walking along a sidewalk, a pedestrian crossing sign post on the road, a speed of the sports car driving next to the user's vehicle 208, the color of the traffic signal, or the combination thereof. The surrounding indicator 204 can be street names being Main Street and Wall Street and an elementary school on the corner of Main Street and Wall Street. The surrounding indicator 204 can include the temperature outside the vehicle, the bumpiness of the road, the baby crying in the backseat, the fatigue level of the user, or the combination thereof. The surrounding indicator 204 can include radio broadcasting, WiFi signal emitted by the school, or the combination thereof.

The driving environment 206 is defined as a totality of conditions that surrounds the user's vehicle 208 while the user is operating the vehicle. For example, the aggregation of the surrounding indicator 204 can represent the totality of conditions that surrounds the user's vehicle 208.

As a specific example, the surrounding indicator 204 can be students leaving school at 3 PM. The surrounding indicator 204 can include vehicles parked on the curbside by the parents waiting to pick up the students. The surrounding indicator 204 can include a pedestrian road sign representing students crossing the street. The aggregation of the surrounding indicator 204 can represent that the driving environment 206 is a school zone.

As a different example, the surrounding indicator 204 can be black ice on the road. The surrounding indicator 204 can be minus 15 degrees Celsius for the temperature outside the user's vehicle 208. The surrounding indicator 204 can be a road that is downhill. The surrounding indicator 204 can be an altitude of 7000 feet. The aggregation of the surrounding indicator 204 can represent the driving environment 206 where the user's vehicle 208 is traveling is a mountainous region in the winter.

As another example, the driving environment 206 representing a school zone can be a range of 100 meter to 1 kilometer in diameter centering from the geographic location of the elementary school. For a further example, the driving environment 206 representing a school zone can be a southwest corner of the elementary school. More specifically, the southwest corner can include five blocks to the south and five blocks to the west from the school. The five blocks by five blocks area of the southwest corner of the school can be the driving environment 206 representing a school zone.

The driving environment 206 can include a moving object 210. The moving object 210 is defined as a non-stationary object while proximate to the user's vehicle 208. As examples, the moving object 210 can include a human being, other vehicles on the road, or the combination thereof. The moving object 210 can be animate or inanimate objects.

The surrounding indicator 204 can be captured by a capturing sensor 212. The capturing sensor 212 is defined as a device that captures the surrounding indicator 204 in the driving environment 206. For example, the capturing sensor 212 can capture the surrounding indicator 204 from the outside, the inside, or the combination thereof of the user's vehicle 208.

As a more specific example, the capturing sensor 212 can represent a digital camera that can capture the images surrounding and inside the user's vehicle 208. The capturing sensor 212 can also represent a video camera that can capture streaming videos of the scenery surrounding the user's vehicle 208.

Also for example, the capturing sensor 212 can represent a shock absorber of the vehicle that can detect the road condition, such as the bumpiness, slipperiness, or the combination thereof of the road. The capturing sensor 212 can represent a remote physiological monitoring sensor on the steering wheel of the vehicle to capture the heart rate of the user. The capturing sensor 212 can represent a portable computing device that can receive radio signals, can have internet connectivity, or the combination thereof. The capturing sensor 212 can represent a microphone that can capture the sound of a baby crying in the back seat.

The navigation system 100 can send, receive, or the combination thereof a tracking communication 214. The tracking communication 214 is defined as a notification used for notifying the user of a geographic location of a target object 216 or notifying the target object 216 of the geographic location of the user's vehicle 208. For example, the tracking communication 214 can include radio beacon, sonic and visual signals, or the combination thereof.

The target object 216 is defined as an object that receives the tracking communication 214 from the user. The target object 216 can include a child with a device to receive the tracking communication 214, a vehicle with the ability to receive the tracking communication 214, or the combination thereof.

A sender location 220 is defined as the geographic location where the tracking communication 214 is sent from. For example, the sender location 220 can be the geographic location where the user's vehicle 208 sent the tracking communication 214 to the target object 216. As a different example, the sender location 220 can represent the geographic location where the target object 216 sent the tracking communication 214 to the user's vehicle 208.

An environment category 222 is defined as grouping of the driving environment 206 based on different characteristics of the driving environment 206. For example, the environment category 222 can divide the driving environment 206 into groups of safe, hazardous, or the combination thereof. As a more specific example, if the environment category 222 for the driving environment 206 is hazardous, the user can require an extra attention 228 while operating the vehicle in the driving environment 206. The driving environment 206 being hazardous can include a construction zone with pot holes on the road.

The user requiring extra attention 228 is defined as the user requiring to be weary or to be more careful within the driving environment 206. For example, the user can require the extra attention 228 when the child is crossing the crosswalk after school, when the user is extremely fatigued, or the combination thereof.

The display interface 202 can display a warning 224 for the user. The warning 224 is defined as a visual notification, an audio notification, or the combination thereof to notify the user of the driving environment 206 being hazardous, to notify the user requiring the extra attention 228, or the combination thereof.

For example, the driving environment 206 being hazardous can represent the driving environment 206 being potentially dangerous or is dangerous. As a more specific example, the driving environment 206 being hazardous can include the driving environment 206 having a construction site in the middle of the intersection, a black ice on the road, or the combination thereof.

The display interface 202 can display a functionality 230 of the navigation system 100. For example, the functionality 230 can represent the function of the navigation system 100 that a user can manipulate to command the navigation system 100. The functionality 230 can include an entry 232 for the user to manually enter the address into the navigation system 100. The functionality 230 can represent a voice instruction 234 for the user to give oral commands to the navigation system 100.

A display appearance 236 is defined as how the display interface 202 appears to the user while the user is operating the vehicle. For example, the display appearance 236 can change by recognizing the hazardousness the driving environment 206. As a more specific example, if the user is operating the vehicle where the driving environment 206 is hazardous, the display appearance 236 can turn red for alerting the user of the hazardousness of the driving environment 206. When the driving environment 206 is not hazardous, the display appearance 236 can be green.

Continuing with the example, the display appearance 236 can be different by changing the font size for the texts that appear on the display interface 202. As a specific example, the texts that appear on the display interface 202 can increase in font size when the driving environment 206 is hazardous to increase the readability of the texts.

As another example, the display appearance 236 can change by removing a selectability 238 of the functionality 230 if the user is operating the vehicle in the driving environment 206 that is hazardous. The selectability 238 is defined as the availability of the functionality 230 while the user is operating the vehicle within the driving environment 206. The availability of the functionality 230 can include a display control appearing or disappearing by recognizing the hazardousness of the driving environment 206.

For a more specific example, the selectability 238 of the functionality 230 for the entry 232 can be "OFF" when the user is operating the vehicle in the driving environment 206 that is hazardous to reduce the user's distraction level from manually entering an address. The display appearance 236 can change from "ON" to "OFF."

As a different example, the selectability 238 of the functionality 230 for the voice instruction 234 can be "ON" to allow the user to give oral commands instead of manual entry to the navigation system 100 when the user is operating the vehicle within the driving environment 206 that is hazardous. The display appearance 236 can change from "OFF" to "ON."

For a further example, the display appearance 236 can change by reducing the amount of information displayed on the display interface 202. More specifically, currently in FIG. 2, the display interface 202 shows multiple vehicles other than the user's vehicle 208. The display interface 202 is also showing people walking around the intersection. When the user is operating the vehicle in the driving environment 206 that is hazardous, the display appearance 236 can change by reducing the amount of information displayed on the display interface 202 by removing the information for the multiple vehicles and people from the display interface 202.

A past indicator 240 is defined as the surrounding indicator 204 previously collected by the navigation system 100. The past indicator 240 is also defined as the driving environment 206 previously recognized by the navigation system 100. For example, the past indicator 240 can represent the time students arrive at school, the time student left school, or the combination thereof. As another example, the past indicator 240 can represent that the intersection at Main Street and Wall Street was recognized by the navigation system 100 to be a school zone.

The past indicator 240 can represent the images captured by the capturing sensor 212 previously of the same geographic location. As a more specific example, the capturing sensor 212 can capture the image of the school where the user's child attends as the surrounding indicator 204. As a further example, the past indicator 240 can be uploaded from a data file, such as a compact disc (CD) or a digital versatile disc (DVD). The navigation system 100 can filter the surrounding indicator 204 captured previously as the past indicator 240.

A user's speed 242 of the user's vehicle 208 can be reduced based on the surrounding indicator 204. For example, the user's speed 242 can be represented as kilometers per hour (kph) or miles per hour (mph).

Figure 3:
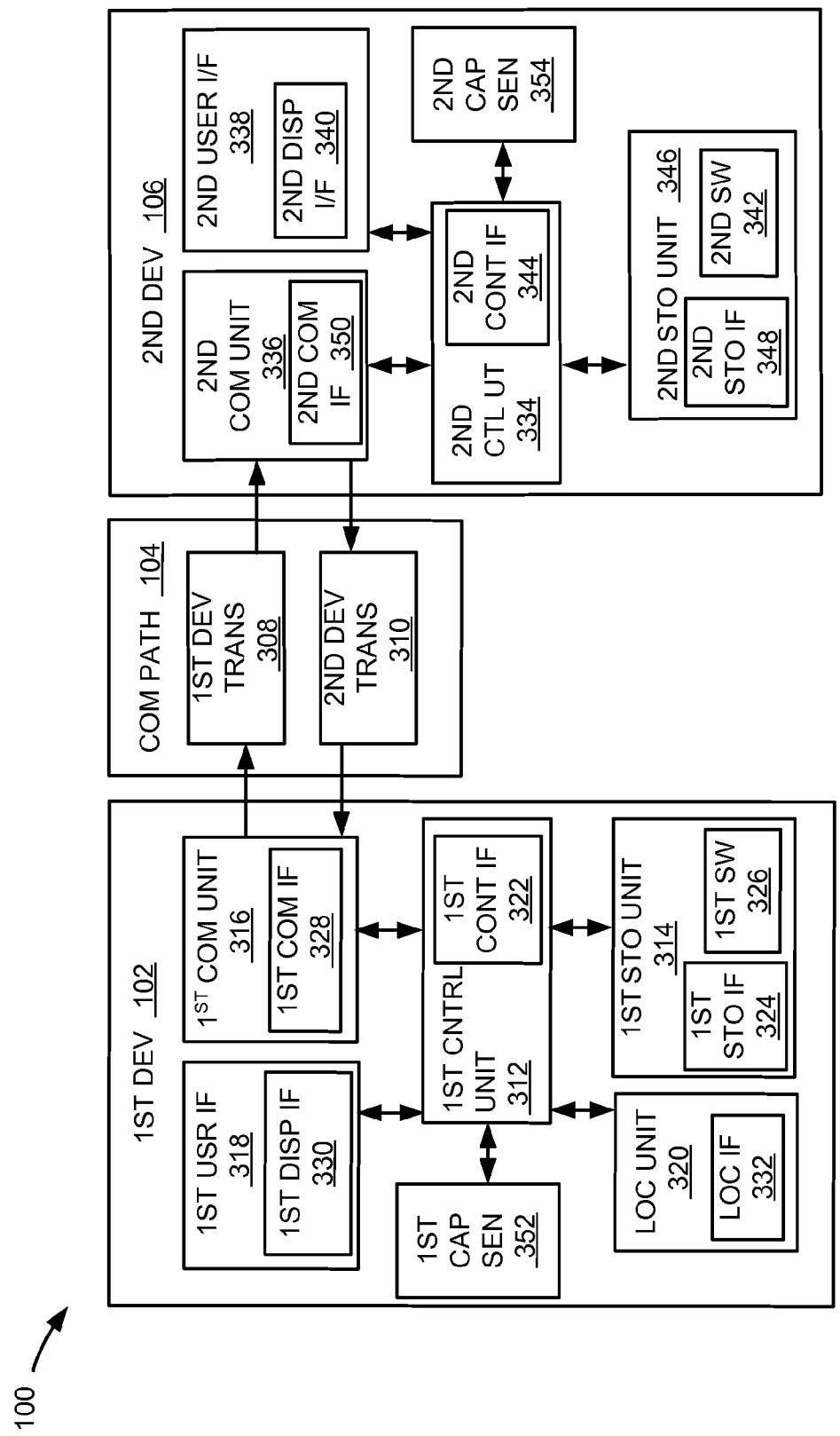
FIG. 3 is an exemplary block diagram of the navigation system.

Referring now to FIG. 3, therein is shown an exemplary block diagram of the navigation system 100. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first device 102 can be similarly described by the first device 102.

The first control unit 312 can include a first control interface 322. The control unit 312 can execute a first software 326 to provide the intelligence of the navigation system 100. The first control unit 312 can be implemented in a number of different manners. For example, the control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations physically separate to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations physically separate to the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs.

The first user interface 318 can include a first display interface 330. Examples of the first display interface 330 can include the display interface 202 of FIG. 2. The first display interface 330 can include a display, a projector, a video screen, a speaker, or any combination thereof. The screen shot shown on the display interface 202 described in FIG. 8 can represent the screen shot for the navigation system 100.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

A first capturing sensor 352 can be the capturing sensor 212 of FIG. 2. The first capturing sensor 352 can capture the surrounding indicator 204 of FIG. 2 in the driving environment 206 of FIG. 2. The first capturing sensor 352 can capture the surrounding indicator 204 from the outside, the inside, or the combination thereof of the user's vehicle 208 of FIG. 2.

Examples of the first capturing sensor 352 can include a digital camera, video camera, thermal camera, night vision camera, infrared camera, x-ray camera, or the combination thereof. Examples of the first capturing sensor 352 can include accelerometer, thermometer, microphone, wireless signal receiver, remote physiological monitoring device, light identifier, or the combination thereof.

A second capturing sensor 354 can be the capturing sensor 212. The second capturing sensor 354 can capture the surrounding indicator 204 in the driving environment 206. The second capturing sensor 354 can capture the surrounding indicator 204 from the outside, the inside, or the combination thereof of the user's vehicle 208 of FIG. 2.

Examples of the second capturing sensor 354 can include a digital camera, video camera, thermal camera, night vision camera, infrared camera, x-ray camera, or the combination thereof. Examples of the second capturing sensor 354 can include accelerometer, thermometer, microphone, wireless signal receiver, remote physiological monitoring device, light identifier, or the combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units.

The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

Figure 4:
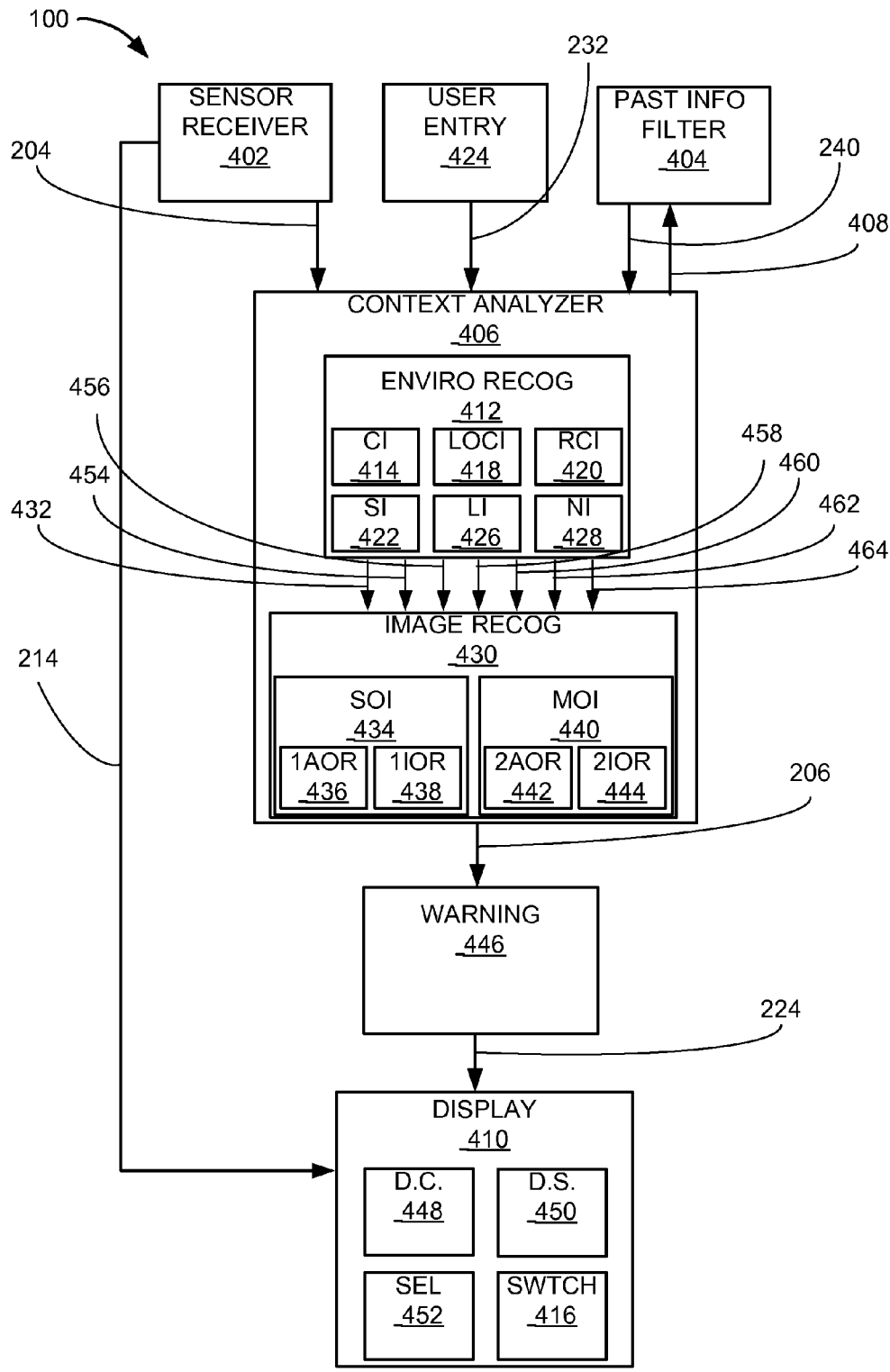
FIG. 4 is a flow of the navigation system.

Referring now to FIG. 4, therein is shown a flow of the navigation system 100. The navigation system 100 can include a sensor receiver module 402. The sensor receiver module 402 receives various information that surrounds the user while the user is operating the vehicle. For example, the sensor receiver module 402 can receive the surrounding indicator 204.

The sensor receiver module 402 can receive the surrounding indicator 204 in a number of ways. For example, the sensor receiver module 402 can include or be connected to the capturing sensor 212 of FIG. 2 that can be a digital camera. The digital image camera can capture the images of the road sign, the school, the road condition, the weather, or the combination thereof.

Also for example, the capturing sensor 212 can be a shock absorber of the vehicle that can detect and transmit the information related to a surface condition of the road. The capturing sensor 212 can capture the surface condition as bumpy or slippery, such as resulting from the gravels or ice on the road.

Further for example, the capturing sensor 212 can be a microphone that can capture the noise inside the vehicle. The capturing sensor 212 can capture the sound of the baby crying in the back seat.

For another example, the sensor receiver module 402 can receive the tracking communication 214 within the driving environment 206 for locating the target object 216 of FIG. 2. For a specific example, the target object 216 can have a handheld device that can also send the tracking communication 214. The user can be operating the vehicle within the driving environment 206 representing a school zone. The child can send the tracking communication 214 of a radio beacon to the sensor receiver module 402 to notify the geographic location of the target object 216.

The sensor receiver module 402 can send the tracking communication 214 to a display module 410. The details regarding the display module 410 displaying the tracking communication 214 will be discussed later.

The capturing sensor 212 can be connected to the sensor receiver module 402 with wired connection, wireless connection, or the combination thereof. For example, a wireless connection can include satellite communication, cellular communication, Bluetooth, IrDA, WiFi, WiMAX, or the combination thereof. As an example, a wired connection can be Ethernet, DSL, FTTH, POTS, or the combination thereof.

The capturing sensor 212 can send the surrounding indicator 204 to the sensor receiver module 402. The sensor receiver module 402 can send the surrounding indicator 204 to a context analyzer module 406.

The navigation system 100 can include a user entry module 424. The user entry module 424 receives the user's entry for the navigation system 100 to recognize the environment for where the user is operating the vehicle. For example, the user entry module 424 can receive the entry 232 made by the user.

The user entry module 424 can receive the entry 232 in a number of ways. For example, the user entry module 424 can receive the entry 232 as manually typed entry, a selection from a list, a voice entry, or the combination thereof.

The user can label the surrounding indicator 204 of an image by manually typing the title of the image as the entry 232. For example, the surrounding indicator 204 can represent an image of a school that the user's child attends. As a more specific example, the user can manually type in as the entry 232 by labeling the image representing the school as "Mike's elementary school."

The user can change the range of the driving environment 206 by increasing or decreasing the diameter by selecting the range as the entry 232. For example, the driving environment 206 can have a range of 40 meters in diameter centering from the geographic location of the elementary school. The user can make the entry 232 to increase the diameter from 40 meters to 200 meters in diameter to cover greater geographic area for the driving environment 206.

The user can manually enter the surrounding indicator 204 as the entry 232 into the user entry module 424. For example, the user can enter that the intersection of the Main Street and the Wall Street is a school zone as the entry 232. The user entry module 424 can send the entry 232 to the context analyzer module 406.

The navigation system 100 can include a past information filter module 404. The past information filter module 404 collects and filters information previously processed by the context analyzer module 406 for recognizing the surrounding environment. For example, the past information filter module 404 can collect the past indicator 240 for the surrounding indicator 204. As another example, the past information filter module 404 can filter the past indicator 240 for identifying an environment category 222 of FIG. 2.

The past information filter module 404 can collect the past indicator 240 in a number of ways. For example, the context analyzer module 406 can send analyzed information 408 to the past information filter module 404. The analyzed information 408 is defined as the surrounding indicator 204 that has been processed by the context analyzer module 406 for recognizing the driving environment 206. The details regarding the context analyzer module 406 will be discussed later.

More specifically, the surrounding indicator 204 that has been processed by the context analyzer module 406 can be a school road sign, heavy student traffic around 3 PM, the intersection of Main Street and Wall Street, or the combination thereof. The past information filter module 404 can collect the past indicator 240 by storing the analyzed information 408 as the past indicator 240.

The past information filter module 404 can filter the past indicator 240 in a number of ways. For example, the past information filter module 404 can filter the past indicator 240 for categorizing the driving environment 206. For example, the past indicator 240 can represent the elementary school on the corner of Main Street and Wall Street. More specifically, the past indicator 240 can include a school road sign, heavy student traffic around 3 PM, the intersection of Main Street and Wall Street, user's past geographic location, the date and time, or the combination thereof. The past information filter module 404 can filter the collection of the past indicator 240 for particular time, location, circumstance, or the combination thereof as the past indicator 240 for the driving environment representing a school zone.

As a different example, the past information filter module 404 can filter the past indicator 240 as a record for the outside temperature at a specific geographic location during a specific time of the year. More specifically, the past indicator 240 can represent minus 15 degrees Celsius in the month of February at Squaw Valley ski resort in California. The past information filter module 404 can filter the collection of the past indicator 240 for particular weather, location, time, or the combination thereof as the past indicator 240 for the driving environment 206 representing a ski resort. The past information filter module 404 can send the past indicator 240 to the context analyzer module 406.

The navigation system 100 can include the context analyzer module 406. The context analyzer module 406 recognizes the context of the area where the user is operating the vehicle operating the navigation system 100. For example, the context analyzer module 406 can recognize the driving environment 206 by identifying the surrounding indicator 204. For a different example, the moving context analyzer module 406 can recognize the driving environment 206 having the moving object 210 of FIG. 2. As another example, the context analyzer module 406 can identify the driving environment 206 for requiring the extra attention 228 of FIG. 2 based on the environment category 222 of FIG. 2.

The context analyzer module 406 can recognize the driving environment 206 in a number of ways. For example, the context analyzer module 406 can include an environment recognition module 412. The environment recognition module 412 recognizes the context of the area where the user is operating the vehicle operating the navigation system 100 by deciphering the environmental factors surrounding the user's vehicle. For example, the environment recognition module 412 can recognize the driving environment 206 by aggregating the surrounding indicator 204 representing environmental factors, such as time, temperature, road condition, geographic location, WiFi connectivity, noise, or the combination thereof.

The environment recognition module 412 can recognize the driving environment 206 in a number of ways. For example, the environment recognition module 412 can include a climate identifier module 414. The climate identifier module 414 identifies a climate condition 454 surrounding the user's vehicle. The climate condition 454 is defined as the composite of weather conditions, such as the temperature, air pressure, humidity, precipitation, winds, or the combination thereof. The surrounding indicator 204 can include the climate condition 454. For example, the climate identifier module 414 can identify the temperature for the inside, outside, or the combination thereof of the user's vehicle.

The climate identifier module 414 can identify the climate condition 454 in a number of ways. For example, the capturing sensor 212 can send the surrounding indicator 204 representing the temperature surrounding the user's vehicle. More specifically, the climate identifier module 414 can read the temperature detected by the capturing sensor 212 to identify the temperature.

As a different example, the past indicator 240 can represent the temperature for the specific region around the same time of the year where the user is operating the vehicle. Additionally, the environment recognition module 412 can utilize a calendar. By comparing the temperature detected by the capturing sensor 212, the time of the year, and the past indicator 240 of the temperature, the climate identifier module 414 can identify whether the temperature surrounding the user's vehicle is relatively warm or cool for the particular time of the year.

The environment recognition module 412 can include a location identifier module 418. The location identifier module 418 identifies a current location 456 of the user's vehicle. The current location 456 is defined as the geographic location of where the user's vehicle is currently operation. The surrounding indicator 204 can include the current location 456. For example, the location identifier module 418 can identify the surrounding indicator 204 representing the current location 456.

The location identifier module 418 can identify the current location 456 in a number of ways. For example, the location identifier module 418 can store or access a map or point of interest data. The location unit 320 of FIG. 3 of the first device 102 of FIG. 3 can detect the current location 456 of the user. The first device 102 can send the current location 456 to the second communication unit 336 of FIG. 3 of the second device 106 of FIG. 3. The location identifier module 418 can receive the current location 456 as the surrounding indicator 204. By locating the current location 456 of the user relative to the map, the location identifier module 418 can identify the user's geographic location on the map.

The environment recognition module 412 can include a road condition identifier module 420. The road condition identifier module 420 identifies a road condition 458 where the user's vehicle is traveling. The road condition 458 is defined as a condition of the road having traffic obstacles. For a further definition, the traffic obstacle is defined as natural or man-made items along the route that effects the flow of traffic. For example, the road condition identifier module 420 can identify the road condition 458 that is bumpy or slippery. The surrounding indicator 204 can include the road condition 458.

The road condition identifier module 420 can identify the road condition 458 in a number of ways. For example, the capturing sensor 212 representing an accelerometer can send the surrounding indicator 204 representing the degree of slipperiness of the road condition 458 where the user's vehicle is currently operating to the road condition identifier module 420. The past indicator 240 can include past records for the road condition 458 where the user is currently traveling. The road condition identifier module 420 can compare the surrounding indicator 204 to the past indicator 240 representing the road condition 458 to identify whether the slipperiness of the road condition 458 for the particular road is a seasonal norm.

As a different example, the past indicator 240 can also indicate the degree of slipperiness for permissible safe travel. The road condition identifier module 420 can identify the severity of the slipperiness by comparing the surrounding indicator 204 to the past indicator 240 representing the table indicating the degree of slipperiness that is permissible for safe travel.

The environment recognition module 412 can include a signal identifier module 422. The signal identifier module 422 identifies the type of transmission signals being emitted in the area where the user's vehicle is operating. For example, the signal identifier module 422 can identify a signal type 460. The signal type 460 is defined as the type of transmission signals received by the capturing sensor 212. The surrounding indicator 204 can include the signal type 460. For a more specific example, the signal identifier module 422 can identify the WiFi signal emitted by the school.

The signal identifier module 422 can identify the signal type 460 in a number of ways. For example, the capturing sensor 212 can send the surrounding indicator 204 representing a WiFi signal. The past indicator 240 can include a record of different types of WiFi signal in the geographic area where the user is traveling. The signal identifier module 422 can compare the surrounding indicator 204 to the past indicator 240 to identify that the surrounding indicator 204 can be a WiFi signal emitted by the school at the corner of Main Street and Wall Street.

As a different example, the signal identifier module 422 can identify the WiFi signal by the strength of its signal. As the vehicle moves away from the source of the WiFi signal, the strength of the WiFi signal deteriorates. On contrary, the strength of the WiFi signal can increase as the vehicle nears. By tracking different strength level of the WiFi signal, the signal identifier module 422 can identify the geographic location of the source of the signal on the map.

As another different example, the signal identifier module 422 can identify the tracking communication 214 sent by handheld device carried by the target object 216. The target object 216 can be at the intersection of Main Street and Wall Street. Having the signal identifier module 422 calibrated to receive the frequency for the tracking communication 214 sent by the target object 216, the signal identifier module 422 can identify the tracking communication 214 to be that of the target object 216.

The environment recognition module 412 can include a light identifier module 426. The light identifier module 426 identifies the level of sunlight for the geographic area where the user's vehicle is operating. For example, the light identifier module 426 can identify a luminosity 462 of the surrounding environment of the user's vehicle. The luminosity 462 is defined as the brightness of sunlight surrounding the user's vehicle. The surrounding indicator 204 can include the luminosity 462. More specifically, the light identifier module 426 can identify the level of darkness at 6 PM at the mountainous road.

The light identifier module 426 can identify the luminosity 462 in a number of ways. For example, the capturing sensor 212 can send the surrounding indicator 204 representing minimal sunlight. The light identifier module 426 can include a photoconductive sensor. The light identifier module 426 can detect strength of the sunlight by tracking the increase or decrease of electrical resistance.

As a different example, the light identifier module 426 can include a photomultiplier tubes. The photomultiplier tube can detect the strength of the surrounding indicator 204 representing the sunlight by detecting how much electrons the sunlight generates.

The environment recognition module 412 can include a noise identifier module 428. The noise identifier module 428 identifies the sound level for the surrounding the user's vehicle. For example, the noise identifier module 428 can identify a noise condition 464 of the surrounding environment of the user's vehicle. The noise condition 464 is defined as the loudness of the sound, the type of sound, or the combination thereof. The surrounding indicator 204 can include the noise condition 464. More specifically, the noise identifier module 428 can identify the decibel level of the outside, inside, or the combination thereof of the user's vehicle.

The noise identifier module 428 can identify the noise condition 464 in a number of ways. For example, the capturing sensor 212 can send the surrounding indicator 204 representing baby crying inside the user's vehicle. The past indicator 240 can represent a decibel comparison chart that delineates the safe level of loudness. By comparing the surrounding indicator 204 to the past indicator 240, the noise identifier module 428 can identify the sound level for operating the vehicle safely.

As a different example, the past indicator 240 can be a recording of the baby crying. The noise identifier module 428 can identify the type of sound by matching the baby's cry to the recording of the baby crying.

The environment recognition module 412 can aggregate the surrounding indicator 204 identified by the climate identifier module 414, the location identifier module 418, the road condition identifier module 420, the signal identifier module 422, the light identifier module 426, and the noise identifier module 428, the environment recognition module 412 for recognizing the driving environment 206. The environment recognition module 412 can aggregate the surrounding indicator 204 in a number of ways. For example, the environment recognition module 412 can recognize the driving environment 206 from comparing the surrounding indicator 204 to the past indicator 240. As a different example, the environment recognition module 412 can recognize the driving environment 206 from comparing and contrasting the surrounding indicator 204.

For a more specific example, the surrounding indicator 204 can represent the outside temperature to be minus 15 degrees Celsius. The surrounding indicator 204 can represent the road condition 458 to be slippery from black ice. The surrounding indicator 204 can represent the geographic location of the user to be Squaw Valley ski resort in California. The surrounding indicator 204 can represent the month to be February. By aggregating all of the surrounding indicator 204, the environment recognition module 412 can recognize the driving environment 206 to be near a ski resort with ice on the road.

For a different example, the location identifier module 418 can identify the user's current geographic location to be near the intersection of Main Street and Wall Street and near the elementary school. The user can enter the intersection of Main Street and Wall Street to be the driving environment 206 representing a school zone for the entry 232. The user can also enter the radius of 50 meters centering from the intersection to be a school zone for the entry 232.

On a second trip, the user can operate the vehicle within the 50 meter radius from the intersection. Subsequently, the surrounding indicator 204 can represent the user's geographic location to be within 50 meter radius from the intersection. By matching the surrounding indicator 204 and the entry 232, the environment recognition module 412 can recognize the driving environment 206 to be a school zone.

The environment recognition module 412 can also predict the driving environment 206 based on the past indicator 240. For example, the past indicator 240 can represent a WiFi signal from the school previously captured by the capturing sensor 212. The past information filter module 404 can filter the past indicator 240 representing a WiFi signal from the school to be the past indicator 240 for the driving environment 206 representing a school zone. Additionally, the past information filter module 404 can filter the past indicator 240 representing the specific geographic area having the WiFi signal reception as the past indicator 240 for the driving environment 206 representing a school zone.

On a different trip the user can operate the vehicle towards the geographic area where the capturing sensor 212 can detect the WiFi signal from the same school. The surrounding indicator 204 can represent the WiFi signal. By tracking the direction where the vehicle is heading and the past indicator 240, the environment recognition module 412 can predict the driving environment 206 to be a school zone.

For illustrative purposes, the navigation system 100 is described with the environment recognition module 412 recognizing the driving environment 206, although it is understood the navigation system 100 can operate the environment recognition module 412 differently. For example, the environment recognition module 412 can filter the surrounding indicator 204 for an image recognition module 430 to recognize the driving environment 206.

The context analyzer module 406 can include the image recognition module 430. The image recognition module 430 recognizes the surrounding environment of the user's vehicle by identifying the content of the images captured by the capturing sensor 212. The details regarding the image recognition module 430 will be discussed later.

The environment recognition module 412 can filter the surrounding indicator 204 in a number of ways. For example, the surrounding indicator 204 can represent a collection of information, such as weather, geographic location, time, images, or the combination. The environment recognition module 412 can filter the surrounding indicator 204 representing environmental factors, such as weather, location, time of the year, temperature, or the combination thereof from non-environmental factors, such as images of the stationary object, non-stationary object, or the combination thereof.

As a more specific example, the environment recognition module 412 can filter the surrounding indicator 204 representing the geographic location indicating the user's vehicle to be at the intersection of Main Street and Wall Street from the images of the intersection. As a different example, the environment recognition module 412 can filter the surrounding indicator 204 representing a temperature of minus 15 degrees Celsius from the images representing snowy road condition 458. The environment recognition module 412 can send a filtered environmental factor 432 to the image recognition module 430. The filtered environmental factor 432 is defined as the surrounding indicator 204 that had been filtered by the environment recognition module 412.

The image recognition module 430 can recognize the driving environment 206 by performing the image recognition algorithm on the surrounding indicator 204 representing images captured by the capturing sensor 212 to identify the content of the images. Some examples of the image recognition algorithm can include a contour and shape based object recognition method, an appearance-based object recognition method, and anchor point detection algorithm.

The image recognition module 430 can recognize the driving environment 206 in a number of ways. For example, the filtered environmental factor 432 can represent the geographic location of the user to be at the intersection of Main Street and Wall Street. By filtered environmental factor 432 having specific information for the intersection, the image recognition module 430 can receive the past indicator 240 representing images specifically related to the intersection from the past information filter module 404.

The image recognition module 430 can recognize the driving environment 206 by comparing the images captured by the capturing sensor 212 to the images from the past indicator 240. The images captured by the capturing sensor 212 can be the images of a school road sign, children, or the combination thereof at the intersection of Main Street and Wall Street.

The image recognition module 430 can include a stationary object identifier module 434. The stationary object identifier module 434 identifies objects that are not in motion. For example, the stationary object identifier module 434 can identify stationary animate objects, such as a child standing still in the corner of Main Street and Wall Street. As a different example, the stationary object identifier module 434 can identify stationary inanimate objects, such as a school, road sign, or the combination thereof.

The stationary object identifier module 434 can identify stationary objects in a number of ways. For example, the stationary object identifier module 434 can include a first animate object recognition module 436. The first animate object recognition module 436 identifies objects that are animate or alive and that are stationary or not in motion. For example, the first animate object recognition module 436 can identify a child standing still.

The first animate object recognition module 436 can identify the animate objects in a number of ways. For example, the first animate object recognition module 436 can perform the image recognition algorithm by comparing the color, the texture cue, the shape, the contour, anchoring points, or the combination thereof of each images captured by the capturing sensor 212. By comparing the anchoring points for the content of the each image, if the anchoring points remain in the same location, the object in the image can be stationary. For a more specific example, a child standing still can be a stationary object, because the anchoring points for the child can remain unchanged from one image to another.

As another example, the capturing sensor 212 can take images of a child when the user drops the child off for school. The image can include the pattern of the child's clothing. The image can include front, back, and profile pictures of the child. The past information filter module 404 can store the images when the child was dropped off as the past indicator 240.

The capturing sensor 212 can capture the image of the user's child when the user is picking up the child after school. The first animate object recognition module 436 can compare the images of the child to the past indicator 240. The past indicator 240 can represent the three dimensional image of the child created from the aggregation of the front, back, and profile pictures of the child. More specifically, the first animate object recognition module 436 can perform the image recognition algorithm by comparing the color, the texture cue, the shape, the contour, anchoring points, or the combination thereof of the images captured by the capturing sensor 212 after school to the stored images to identify that the image is user's child.

Continuing with the example, the first animate object recognition module 436 can receive the past indicator 240 representing the digital images of children and adults. The first animate object recognition module 436 can perform the image recognition algorithm by comparing the color, the texture cue, the shape, the contour, anchoring points, or the combination thereof of the images captured by the capturing sensor 212 of the user's child to the past indicator 240 for distinguishing the user's child from the adults and other children. For a further example, the first animate object recognition module 436 can identify that there are multiple children in the image captured by the capturing sensor 212 by identifying the number of human children in the image.

Continuing with the example, the first animate object recognition module 436 can receive digital images of children from the same geographic location as discussed previously during a different time of the day. The past indicator 240 representing images for the intersection of Main Street and Wall Street around 11 AM can show no student traffic, as the children can be in school. The past indicator 240 representing the image for the intersection of Main Street and Wall Street around 3 PM can show heavy student traffic, as the children are leaving school for home. The time can be 2:50 PM. By performing the image recognition algorithm, the first animate object recognition module 436 can identify that the images captured by the capturing sensor 212 showing many children was captured around 3 PM.

The stationary object identifier module 434 can include a first inanimate object recognition module 438. The first inanimate object recognition module 438 identifies objects that are inanimate or not alive and that are stationary or not in motion. For example, the first inanimate object recognition module 438 can identify a parked car, road sign, or the combination thereof.

The first inanimate object recognition module 438 can identify the inanimate objects in a number of ways. For example, the first inanimate object recognition module 438 can compare the images of the school road sign to the images of a school road sign stored in the past information filter module 404. More specifically, the first inanimate object recognition module 438 can perform the image recognition algorithm by comparing the color, the texture cue, the shape, the contour, anchoring points, or the combination thereof of the images captured by the capturing sensor 212 to the past indicator 240 to identify that the image is a school road sign.

The stationary object identifier module 434 can identify the surrounding indicator 204 to be stationary objects by aggregating the images identified by the first animate object recognition module 436 and the first inanimate object recognition module 438. As previously mentioned, the stationary object identifier module 434 can identify the geographic location of the stationary objects to be near the intersection of Main Street and Wall Street and near the elementary school from the information provided in the filtered environmental factor 432.

The image recognition module 430 can include a moving object identifier module 440. The moving object identifier module 440 identifies objects that are in motion. For example, the moving object identifier module 440 can identify the moving object 210.

The moving object identifier module 440 can identify the moving object 210 in a number of ways. For example, the moving object identifier module 440 can include a second animate object recognition module 442. The second animate object recognition module 442 identifies objects that are animate or alive and that are in motion. For example, the second animate object recognition module 442 can identify the user blinking his or her eyelids.

The second animate object recognition module 442 can identify an animate object in motion in a number of ways. For example, the second animate object recognition module 442 can perform the image recognition algorithm by comparing the color, the texture cue, the shape, the contour, anchoring points, or the combination thereof of each images captured by the capturing sensor 212. By comparing the anchoring points for the content of the each image, if the anchoring points do not remain in the same location, the object in the image can be in motion. For a more specific example, the eyelids can be a non-stationary object, because the anchoring points for the eyelids can change from one image to another when a person blinks.

Continuing with the example, the capturing sensor 212 can capture the surrounding indicator 204 representing the fatigue level of the user to be extremely fatigued. For a more specific example, the capturing sensor 212 can capture the digital image of the user's face repeatedly while the user is operating the vehicle. While the user is not fatigued, the eyelids of the user can remain open longer than being closed.

The second animate object recognition module 442 can assign anchoring points to the eyelids for each images captured by the capturing sensor 212. The second animate object recognition module 442 can track the length of the eyelids being shut by comparing the location of the anchoring points in the images with eyelids closed to the images with eyelids open. If the duration of the eyelids being shut is longer than the eyelids being opened, the second animate object recognition module 442 can identify that the user is extremely fatigued and falling asleep while operating the vehicle.

The moving object identifier module 440 can include a second inanimate object recognition module 444. The second inanimate object recognition module 444 identifies objects that inanimate or not alive and that are in motion. For example, the second inanimate object recognition module 444 can identify a vehicle in motion.

The second inanimate object recognition module 444 can identify an inanimate object in a number of ways. For example, the capturing sensor 212 can capture the surrounding indicator 204 representing the image of the rotating hub cap of the vehicle other than the user's vehicle. The second inanimate object recognition module 444 can compare the images of the rotating hubcap to the images of the hub cap stored in the past information filter module 404. More specifically, the second inanimate object recognition module 444 can perform the image recognition algorithm by comparing the color, the texture cue, the shape, the contour, anchoring points, or the combination thereof of the images captured by the capturing sensor 212 to the past indicator 240 to identify that the image is a hubcap.

The second inanimate object recognition module 444 can assign anchoring points to the rotating hub cap. The second inanimate object recognition module 444 can track the change of location of the anchoring points to determine that the wheel of the vehicle is rotating. Subsequently, the second inanimate object recognition module 444 can identify that the moving object 210 is a vehicle.

The moving object identifier module 440 can identify the surrounding indicator 204 to be moving objects by aggregating the images identified by the second animate object recognition module 442 and the second inanimate object recognition module 444. As previously mentioned, the moving object identifier module 440 can identify the geographic location of the moving objects to be near the intersection of Main Street and Wall Street and near the elementary school from the information provided in the filtered environmental factor 432.

The image recognition module 430 can aggregate the surrounding indicator 204 identified by the stationary object identifier module 434, the moving object identifier module 440, and the environment recognition module 412. The image recognition module 430 can aggregate the surrounding indicator 204 in a number of ways. For example, the image recognition module 430 can recognize the driving environment 206 from comparing the surrounding indicator 204 to the past indicator 240. As a different example, the image recognition module 430 can recognize the driving environment 206 from comparing and contrasting the surrounding indicator 204. As another example, the image recognition module 430 can recognize the driving environment 206 by factoring the surrounding indicator 204 for improving reliability for recognizing the driving environment 206.

The image recognition module 430 can factor the surrounding indicator 204 in a number of ways. For example, the image recognition module 430 can factor the climate condition 454 for improving reliability for recognizing the driving environment 206. More specifically, the additional information from the climate identifier module 414 provides additional information for the image recognition module 430 to recognize the driving environment 206.

The climate identifier module 414 can sense that the temperature is below freezing and if weather reports indicate snow or recent snow, then the image recognition module 430 can modify its recognition to account for environment having snow. This improves reliability and accuracy for the recognition process by feeding more information that may be used to filter the information being recognized. One example of how the image recognition module 430 can improve the image recognition is by the image recognition module 430 selecting the past indicator 240 representing past images or image recognition algorithm to account for the color of snow, color or images of the road having snow or salted roads to reduce icing, snow overhang traffic lights, ice precipitation hanging from stop signs, and other indications from the filtered environmental factor 432 representing an environment having snow.

Another example for the image recognition module 430 improving the image recognition can be by accounting for the geographic location of the user's vehicle identified by the location identifier module 418. For example, the image recognition module 430 can factor the current location 456 for improving reliability for recognizing the driving environment 206. More specifically, the location identifier module 418 can identify the current location 456 of the user's vehicle to be at the intersection of Main Street and Wall Street. The image recognition module 430 can reduce the search time and improve the selection of the past indicator 240 by selecting the images specifically related to the intersection of Main Street and Wall Street. Additionally, the image recognition module 430 can reduce the computation time of the image recognition algorithm by accounting for the type of road signs available at the intersection, the type of building surrounding the intersection, or the combination thereof.

For a different example, the image recognition module 430 can improve the image recognition by accounting for the road condition 458. For example, the image recognition module 430 can factor the road condition 458 for improving reliability for recognizing the driving environment 206. More specifically, the road condition identifier module 420 can identify the road condition 458 to be a gravel road. The image recognition module 430 can reduce the search time and improve the selection of the past indicator 240 by not selecting the images that represents highways by accounting the gravel road. Additionally, the image recognition module 430 can reduce the computation time of the image recognition algorithm by accounting for the absence of skyscrapers, large number human traffic, or the combination thereof.

For another example, the image recognition module 430 can improve the image recognition by accounting for the signal type 460. For example, the image recognition module 430 can factor the signal type 460 for improving reliability for recognizing the driving environment 206. More specifically, the signal identifier module 422 can identify the WiFi signal to be a signal from the school. The image recognition module 430 can reduce the search time and improve the selection of the past indicator 240 by selecting the images that represents the school, the surrounding buildings, the road sign, or the combination thereof by accounting the source of the signal. Additionally, the image recognition module 430 can reduce the computation time of the image recognition algorithm by accounting for the surrounding buildings to include the school, the road signs to include a "pedestrian walking" sign, or the combination thereof.

As a different example, the image recognition module 430 can improve the image recognition by accounting for the luminosity 462. For example, the image recognition module 430 can factor the luminosity 462 for improving reliability for recognizing the driving environment 206. More specifically, in combination with the time of the day, the light identifier module 426 can identify the level of sunlight to be twilight. The image recognition module 430 can reduce the search time and improve the selection of the past indicator 240 by selecting the images captured during dawn, dusk, or the combination thereof. Additionally, the image recognition module 430 can reduce the computation time of the image recognition algorithm by accounting for the color of the object under twilight, the angle of the sunlight hitting the object, or the combination thereof.

As another example, the image recognition module 430 can improve the image recognition by accounting for the noise of the surrounding environment. For example, the image recognition module 430 can factor the noise condition 464 for improving reliability for recognizing the driving environment 206. More specifically, the noise identifier module 428 can identify the noise to be drillings of a concrete surface at a construction site. The image recognition module 430 can reduce the search time and improve the selection of the past indicator 240 by not selecting the images from National Parks in the United States, such as Yellowstone National Park or Grand Canyon National Park. Additionally, the image recognition module 430 can reduce the computation time of the image recognition algorithm by not accounting for the images of objects representing forest, wild animals, camping ground, or the combination thereof.

It has been discovered that the present invention provides the navigation system 100 for providing safe operation of the navigation system 100 and other user interface system within the vehicle. The safe operation is provided by reducing the speed and improving the accuracy for the image recognition module 430 to recognize the driving environment 206. More specifically, the image recognition module 430 can reduce the complexity of selecting the past indicator 240 by factoring the surrounding environment 204 to narrow the images utilized for the image recognition module. With a fewer images to select and to conduct the image recognition algorithm, the image recognition module 430 can increase the reliability for recognizing the driving environment 206. By reducing the speed for recognizing the driving environment 206, the user can respond to the change of the driving environment 206 quicker. Additionally, by improving the accuracy for recognizing the driving environment 206, the user can better assess the context of what kind of the driving environment 206 the user is currently operating the vehicle.

The image recognition module 430 can also identify the driving environment 206 for requiring the extra attention 228 based on the environment category 222. The user entry module 424 can receive the entry 232 for the environment category 222. The user can define the environment category 222 for the driving environment 206 representing a residential area with pitch-black darkness on Halloween to be hazardous as the entry 232. The user entry module 424 can send the entry 232 for the environment category 222 to the image recognition module 430.

Continuing with the example, the environment recognition module 412 can filter the surrounding indicator 204 representing information related to Halloween. The light identifier module 426 can identify the sunlight level of the outside to be pitch-black. The calendar in the environment recognition module 412 can indicate that the date to be Halloween and the time to be 6:00 PM. The location identifier module 418 can identify the geographic location of the user to be 50 yards from the user's residence. The environment recognition module 412 can send the filtered environmental factor 432 representing the sunlight level, time of the year, and the geographic location to the image recognition module 430.

Continuing with the example, the past information filter module 404 can send the past indicator 240 representing the digital images of the neighborhood around the user's residence to the first inanimate object recognition module 438 by identifying the content of the filtered environmental factor 432 to be as described previously. The images captured by the capturing sensor 212 can be the images of the neighborhood around the user's residence. The first inanimate object recognition module 438 can perform the image recognition algorithm by comparing the color, the texture cue, the shape, the contour, anchoring points, or the combination thereof of the images captured by the capturing sensor 212 to the past indicator 240 to identify the images to be the neighborhood around the user's residence.

Continuing with the example, the neighborhood can be decorated by Halloween ornaments and lighting. For a more specific example, the capturing sensor 212 can capture the digital image of the lighting blinking on and off. The second inanimate object recognition module 444 can perform the image recognition algorithm by comparing the color, the texture cue, the shape, the contour, anchoring points, or the combination thereof of the images captured by the capturing sensor 212 to the past indicator 240 to identify that the image is a Halloween lighting ornament.

The second inanimate object recognition module 444 can assign anchoring points to the blinking lights for each images captured by the capturing sensor 212. The second inanimate object recognition module 444 can track the change of location of the anchoring points to determine that the light is blinking. Subsequently, the second inanimate object recognition module 444 can identify that the moving object 210 are lights from Halloween ornaments and not lights from other vehicle.

Continuing with the previous example, the first animate object recognition module 436, the user can be extremely fatigued. The image recognition module 430 can recognize the driving environment 206 to be a residential area by identifying the user's current geographic location and images of the user's neighborhood. Furthermore, the image recognition module 430 can identify the driving environment 206 for requiring the extra attention 228 based on the environment category 222 by identifying the user's fatigue level, the time of year being Halloween, the driving environment 206, and the lack of sunlight. The context analyzer module 406 can send the driving environment 206 to a warning module 446.

The navigation system 100 can include the warning module 446. The warning module 446 notifies the user regarding the environment where the user is currently operating the vehicle. For example, the warning module 446 can generate the warning 224 based on the driving environment 206 being hazardous.

The warning module 446 can generate the warning 224 in a number of ways. For example, the warning module 446 can recognize the driving environment 206 to be a construction zone. The warning module 446 can generate the warning 224 in the format of a text message to be displayed on the display module 410 to warn the user of the construction trucks coming in and out of the construction site. As a different example, the warning module 446 can generate the warning 224 in the format of audio to warn the user of the decreased speed limit enforced by the construction worker with a sign. The warning module 446 can send the warning 224 to the display module 410.

For another example, the warning module 446 can send the warning 224 to the user's vehicle 208 for reducing the user's speed 242 of FIG. 2. After the driving environment 206 is recognized as being hazardous, the warning module 446 can send the warning 224 via the first control interface 322 of FIG. 3 to the automatic braking system of the user's vehicle 208 to reduce the user's speed 242 automatically. For a specific example, the driving environment 206 recognized includes a child running out on the street suddenly. The warning module 446 can send the warning 224 to invoke the automatic braking system to stop the user's vehicle 208 immediately.

For illustrative purposes, the navigation system 100 is described with the warning module 446 generating the warning 224, although it is understood that the navigation system 100 can operate the warning module 446 differently. For example, the warning module 446 can send the tracking communication 214 while within the driving environment 206 for notifying the target object 216 of the sender location 220 of FIG. 2.

The warning module 446 can send the tracking communication 214 in a number of ways. For example, the target object 216 can represent the user's child. More specifically, the child can hold a handheld device, which can be the first device 102 of FIG. 1 or the first devices 302 of FIG. 3, for receiving the tracking communication 214. The user can send the tracking communication 214 of a radio beacon to the child's handheld device to notify the child of the sender location 220 representing his mother's geographic location.

The navigation system 100 can include the display module 410. The display module 410 displays the notification to notify the user of the surrounding environment. For example, the display module 410 can display the warning 224.

The display module 410 can display the warning 224 in a number of ways. For example, the warning 224 can be displayed as a text message on the display interface 202 of FIG. 2. As a different example, the warning 224 can be display as an icon that represents an exclamation mark.

For illustrative purposes, the navigation system 100 is described with the display module 410 displaying the warning 224, although it is understood that the navigation system 100 can operate the display module 410 differently. For example, the display module 410 can change the look and feel of the display interface 202 by changing the display appearance 236 of FIG. 2 based on the driving environment 206 for alerting the driving environment 206.

The display module 410 can change the display appearance 236 for alerting the driving environment 206 to the user in a number of ways. For example, the display module 410 can include a display color module 448. The display color module 448 changes the look and feel of the display interface 202 by changing the color of the display interface 202. For example the display color module 448 can change the display appearance 236 by changing the color of the display interface 202. As a specific example, if the user is operating the vehicle in the driving environment 206 representing a school zone with heavy student traffic, the display module 410 can change the color of the display interface 202 from green to red to alert the user of the driving environment 206 being hazardous.

The display module 410 can include a display size module 450. The display size module 450 changes the look and feel of the display interface 202 by changing the font size of the text appearing on the display interface 202. For example, the display size module 450 can change the display appearance 236 by changing the font size of the warning 224. For a specific example, if the user is operating the vehicle in the driving environment 206 representing a Time Square in New York with heavy human traffic, the display module 410 can increase the font size of the text for the warning 224 to ease the readability of the warning 224.

For illustrative purposes, the navigation system 100 is described with the display module 410 changing the display appearance 236, although it is understood that the navigation system 100 can operate the display module 410 differently. For example, the display module 410 can vary the selectability 238 of FIG. 2 of the functionality 230 of FIG. 2 based on the driving environment 206 for displaying on the device 102.

The display module 410 can vary the selectability 238 in a number of ways. For example, the display module 410 can include a selectivity module 452. The selectivity module 452 changes the look and feel of the display interface 202 by removing the functions available on the device 102 that a user can choose to manipulate the navigation system 100. More specifically, the selectivity module 452 can change the display appearance 236 by changing the display appearance 236 for removing the selectability 238 of the functionality 230 for reducing distraction.

As a specific example, the driving environment 206 can be a ski resort area with roads covered with black ice. The selectivity module 452 can remove the selectability 238 of the "settings" function of the navigation system 100 while the user operates the vehicle on roads covered with black ice. The "settings" function can allow the user to configure the time setting for the navigation system 100. The selectivity module 452 can change the display appearance 236 from "ON" to "OFF" for the "settings" to remove the selectability 238 for the user to change the "settings" manually while the user is operating the vehicle on roads with black ice.

As a different example, the display module 410 can include a switch module 416. The switch module 416 enables or disables the functions for the navigation system 100 by recognizing the driving environment 206 being hazardous. As a specific example, the switch module 416 can disable the functionality 230 when the driving environment 206 is hazardous.

The switch module 416 can enable or disable the functionality 230 in a number of ways. For example, the switch module 416 can enable the voice instruction 234 of FIG. 2 for recognizing the driving environment 206 for being hazardous, such as a school zone with heavy student traffic, for requiring minimal distraction. Based on the driving environment 206 being hazardous, the switch module 416 can disable the functionality 230 for making the entry 232 of FIG. 2 manually by turning the functionality 230 for the entry 232 "OFF." Based on the driving environment 206 being hazardous, the switch module 416 can enable the functionality 230 for the voice instruction 234 by turning the functionality 230 "ON" to allow the user to make oral commands to the navigation system 100.

For illustrative purposes, the navigation system 100 is described with the display module 410 displaying the warning 224, although it is understood that the navigation system 100 can operate the display module 410 differently. For example, the display module 410 can display the tracking communication 214 on the display interface 202.

The display module 410 can display the tracking communication 214 in a number of ways. For example, the display module 410 can display the tracking communication 214 in different color from the sender location 220. As a different example, the display module 410 can display the tracking communication 214 by blinking the marker that represents the target object 216 on the display interface 202.

The physical transformation from disabling the functionality 230 results in movement in the physical world, such as people using the first device 102 of FIG. 3, the vehicle, or a combination thereof, based on the operation of the navigation system 100. As the movement in the physical world occurs, the movement itself creates additional information that is converted back to the functionality 230 for the continued operation of the navigation system 100 and to continue the movement in the physical world.

The first software 326 of FIG. 3 of the first device 102 of FIG. 3 can include the navigation system 100. For example, the first software 326 can include the sensor receiver module 402, the user entry module 424, the past information filter module 404, the context analyzer module 406, the warning module 410, and the display module 410.

The user entry module 402 can represent the first user interface 318 of FIG. 3. The entry 232, the environment category 222, or the combination thereof can be entered or selected into the first user interface 318.

The first control unit 312 of FIG. 3 can execute the first capturing sensor 352 of FIG. 3 to capture the surrounding indicator 204. The first control unit 312 can execute the first software 326 for the sensor receiver module 402 to receive the surrounding indicator 204 from the first capturing sensor 352. The first control unit 312 can execute the first software 326 for the sensor receiver module 402 to send the surrounding indicator to the context analyzer module 406. The first control unit 312 can execute the first software 326 for the sensor receiver module 402 to receive the tracking communication 214. The first control unit 312 can execute the first software 326 for the sensor receiver module 402 to send the tracking communication 214 to the display module 410.

The first control unit 312 can execute the first software 326 for the past information filter module 404 to send the past indicator 240 to the context analyzer module 406. The first control unit 312 can execute the first software 326 for the past information filter module 404 to collect past indicator 240 for the surrounding indicator 204. The first control unit 312 can execute the first software 326 for the past information filter module 404 to receive the analyzed information 408 from the context analyzer module 406.

The first control unit 312 can execute the first software 326 for the context analyzer module 406 to recognize the driving environment 206 for identifying the surrounding indicator 204. The first control unit 312 can execute the first software 326 for the context analyzer module 406 to predict the driving environment 206 based on the past indicator 240. The first control unit 312 can execute the first software 326 for the context analyzer module 406 to send the driving environment 206 to the warning module 446.

The first control unit 312 can execute the first software 326 for the warning module 446 to generate the warning 224 based on the driving environment 206 for being hazardous. The first control unit 312 can execute the first software 326 for the warning module 446 to send the warning 224 to the display module 410.

The display module 410 can represent the first display interface 330. The first control unit 312 can execute the first display interface 330 for the switch module 416 to disable the functionality 230 for recognizing the driving environment 206 for being hazardous. The first control unit 312 can execute the first display interface 330 for the display color module 448 to change the display appearance 236 based on the driving environment 206 for alerting the driving environment 206. The first control unit 312 can execute the first display interface 330 for the selectivity module 452 to change the display appearance 236 for removing the selectability 238 of the functionality 230.

The second software 342 of FIG. 3 of the second device 106 of FIG. 3 can include the navigation system 100. For example, the second software 342 can include the sensor receiver module 402, the user entry module 424, the past information filter module 404, the context analyzer module 406, the warning module 410, and the display module 410.

The user entry module 402 can represent the second user interface 338 of FIG. 3. The entry 232, the environment category 222, or the combination thereof can be entered or selected into the second user interface 338.

The second control unit 334 of FIG. 3 can execute the second capturing sensor 354 to capture the surrounding indicator 204. The second control unit 334 can execute the second software 342 for the sensor receiver module 402 to receive the surrounding indicator 204 from the second capturing sensor 354. The second control unit 334 can execute the second software 342 for the sensor receiver module 402 to send the surrounding indicator to the context analyzer module 406. The second control unit 334 can execute the second software 342 for the sensor receiver module 402 to receive the tracking communication 214. The second control unit 334 can execute the second software 342 for the sensor receiver module 402 to send the tracking communication 214 to the display module 410.

The second control unit 334 can execute the second software 342 for the past information filter module 404 to send the past indicator 240 to the context analyzer module 406. The second control unit 334 can execute the second software 342 for the past information filter module 404 to collect past indicator 240 for the surrounding indicator 204. The second control unit 334 can execute the second software 342 for the past information filter module 404 to receive the analyzed information 408 from the context analyzer module 406.

The second control unit 334 can execute the second software 342 for the context analyzer module 406 to recognize the driving environment 206 for identifying the surrounding indicator 204. The second control unit 334 can execute the second software 342 for the context analyzer module 406 to predict the driving environment 206 based on the past indicator 240. The second control unit 334 can execute the second software 342 for the context analyzer module 406 to send the driving environment 206 to the warning module 446.

The second control unit 334 can execute the second software 342 for the warning module 446 to generate the warning 224 based on the driving environment 206 for being hazardous. The second control unit 334 can execute the second software 342 for the warning module 446 to send the warning 224 to the display module 410.

The display module 410 can represent the second display interface 340 of FIG. 3. The second control unit 334 can execute the second display interface 340 for the switch module 416 to disable the functionality 230 for recognizing the driving environment 206 for being hazardous. The second control unit 334 can execute the second display interface 340 for the display color module 448 to change the display appearance 236 based on the driving environment 206 for alerting the driving environment 206. The second control unit 334 can execute the second display interface 340 for the selectivity module 452 to change the display appearance 236 for removing the selectability 238 of the functionality 230.

The navigation system 100 can be partitioned between the first device 102 and the second device 106. For example, the navigation system 100 can be partitioned into the functional units of the first device 102, the second device 106, or a combination thereof. The navigation system 100 can also be implemented as additional functional units in the first device 102, the second device 106, or a combination thereof.

As another example, the navigation system 100 can be partitioned between the first software 326 and the second software 342. For example, the second software 342 can include the context analyzer module 406. The second control unit 334 can execute modules partitioned on the second software 342.

For example, the second control unit 334 can execute the second software 342 to execute the context analyzer module 406. The second control unit 334 can execute the second software 342 for the context analyzer module 406 to recognize the driving environment 206 for identifying the surrounding indicator 204. The second control unit 334 can execute the second software 342 for the context analyzer module 406 to generate the warning 224 based on the driving environment 206 being hazardous. The second control unit 334 can execute the second software 342 for the context analyzer module 406 to send the tracking communication 214 while the user is within the driving environment 206.

The second control unit 334 can execute the second software 342 for the context analyzer module 406 to receive the entry 232 from the user entry module 424. The second control unit 334 can execute the second software 342 for the context analyzer module 406 to receive the surrounding indicator 204 from the sensor receiver module 402.

The first software 326 can include the sensor receiver module 402, the user entry module 424, the warning module 446, and the display module 410. Based on the size of the first storage unit 314 of FIG. 3, the first software 326 can include additional modules of the navigation system 100. The first control unit 312 can execute the modules partitioned on the first software 326.

The first control unit 312 can execute the first software 326 for the sensor receiver module 402 to receive the surrounding indicator 204 from the first capturing sensor 352. The first control unit 312 can execute the first software 326 for the sensor receiver module 402 to send the surrounding indicator 204 to the context analyzer module 406. The first control unit 312 can execute the first software 326 for the sensor receiver module 402 to send the tracking communication 214 to the display module 410.

The entry 232 can be entered into the first user interface 318. The surrounding indicator 204 can be captured into the first storage interface 324 of FIG. 3. The first control unit 312 can operate the first communication unit 316 of FIG. 3 to send the surrounding indicator 204, the entry 232, or the combination thereof to the second device 106. The first control unit 312 can operate the first software 326 to operate the location unit 320 of FIG. 3.

The second communication unit 336 of FIG. 3 can send the driving environment 206, the warning 224, or the combination thereof to the first device 102 through the communication path 104 of FIG. 3. The warning 224 can be displayed on the first display interface 330 and the second device 106. The display appearance 236 for the display interface 330 can be changed by removing the selectability 238 of the functionality 230 of the first user interface 318. The functionality 230 of the first user interface 318 can be disabled based on the driving environment 206.

It has been discovered that the present invention provides the navigation system 100 for providing safe operation of the navigation system 100 and other user interface system within a vehicle. The safe operation is provide by recognizing the driving environment 206 based on the navigation system 100 receiving the surrounding indicator 204 to aid the user for operating the vehicle to travel along the travel path safely. The navigation system 100 disabling the functionality 230 can aid the user by reducing distractions while operating the vehicle.

The navigation system 100 describes the module functions or order as an example. The modules can be partitioned differently. For example, the user entry module 424 and the sensor receiver module 402 can be combined. Each of the modules can operate individually and independently of the other modules.

Figure 5:
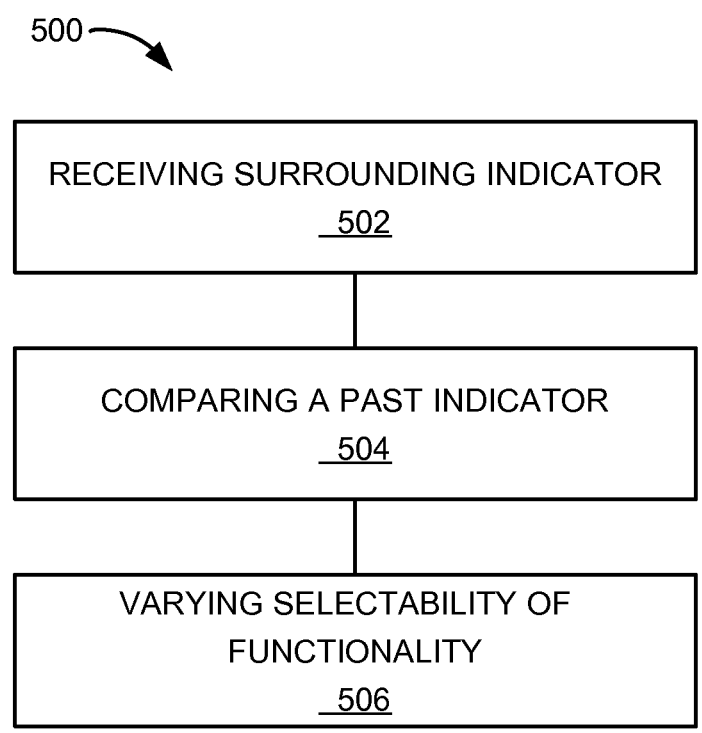
FIG. 5 is a flow chart of a method of operation of a navigation system in a further embodiment of the present invention.

Referring now to FIG. 5, therein is shown a flow chart of a method 500 of operation of a navigation system 100 in a further embodiment of the present invention. The method 500 includes: receiving a surrounding indicator in a block 502; comparing a past indicator to the surrounding indicator for recognizing a driving environment in a block 504; and varying a selectability of a functionality based on the past indicator compared for displaying on a device in a block 506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hitherto set forth herein or shown in the accompanying drawings are to be interpreted in an illustrative and non-limiting sense.

What is claimed is:

1. A method of operation of a navigation system comprising:
   receiving a plurality of a surrounding indicator;
   filtering the plurality of the surrounding indicator including an environmental factor and a non-environmental factor including an image of an object;
   filtering a past indicator based on a particular time, a location, and a circumstance for categorizing a driving environment;
   comparing the past indicator including the image of the environmental factor to the plurality of the surrounding indicator with a control unit for recognizing the driving environment to identify an animate object and an inanimate object, each process to identify the animate object in motion or stationary or the inanimate object in motion or stationary performed independently from one another, and
   varying a selectability of a functionality based on the past indicator compared for reducing an amount of information displayed on a device.

2. The method as claimed in claim 1 further comprising sending a tracking communication for notifying a target object of a sender location within the driving environment.

3. The method as claimed in claim 1 further comprising receiving a tracking communication for locating a target object within the driving environment.

4. The method as claimed in claim 1 further comprising generating a warning based on the surrounding indicator for recognizing the driving environment.

5. The method as claimed in claim 1 further comprising generating a warning based on the surrounding indicator for reducing a user's speed of a user's vehicle.

6. A method of operation of a navigation system comprising:
   receiving a plurality of a surrounding indicator;
   filtering the plurality of the surrounding indicator including an environmental factor and a non-environmental factor including an image of an object;
   filtering a past indicator based on a particular time, a location, and a circumstance for categorizing a driving environment;
   comparing the past indicator including the image of the environmental factor to the plurality of the surrounding indicator with a control unit for recognizing the driving environment to identify an animate object and an inanimate object, each process to identify the animate object in motion or stationary or the inanimate object in motion or stationary performed independently from one another, for requiring extra attention; and
   varying a selectability of a functionality based on the past indicator compared for reducing an amount of information displayed on a device.

7. The method as claimed in claim 6 further comprising:
   changing a display appearance by removing a functionality based on the surrounding indicator; and
   enabling a voice instruction based on the display appearance with the functionality removed.

8. The method as claimed in claim 6 wherein varying the selectability includes changing a display appearance for removing the selectability of the functionality for reducing distraction.

9. The method as claimed in claim 6 further comprising:
   filtering the surrounding indicator; and
   wherein:
   comparing the past indicator includes factoring the surrounding indicator for improving a reliability for recognizing the driving environment.

10. The method as claimed in claim 6 further comprising defining the environment category for categorizing the driving environment for identifying the driving environment to pay extra attention within the driving environment.

11. A navigation system comprising:
    a capturing sensor for sending a plurality of a surrounding indicator; and
    a control unit including a processor, coupled to the capturing sensor, for:
    filtering the plurality of the surrounding indicator including an environmental factor and a non-environmental factor including an image of an object,
    filtering a past indicator based on a particular time, a location, and a circumstance for categorizing a driving environment,
    comparing the past indicator including the image of the environmental factor to the plurality of the surrounding indicator for recognizing the driving environment to identify an animate object and an inanimate object, each process to identify the animate object in motion or stationary or the inanimate object in motion or stationary performed independently from one another, and varying a selectability of a functionality based on the past indicator compared for reducing an amount of information displayed on a device.

12. The system as claimed in claim 11 wherein the control unit is for sending a tracking communication for notifying a target object of a sender location within the driving environment.

13. The system as claimed in claim 11 wherein the control unit is for receiving a tracking communication for locating a target object within the driving environment.

14. The system as claimed in claim 11 wherein the control unit is for generating a warning based on the surrounding indicator for recognizing the driving environment.

15. The system as claimed in claim 11 wherein the control unit is for generating a warning based on the surrounding indicator for reducing a user's speed of a user's vehicle.

16. The system as claimed in claim 11 wherein the control unit is for comparing a past indicator to the surrounding indicator for recognizing a driving environment requiring extra attention.

17. The system as claimed in claim 16 wherein the control unit is for:
changing a display appearance by removing a functionality based on the surrounding indicator; and
enabling a voice instruction based on the display appearance with the functionality removed.

18. The system as claimed in claim 16 wherein the control unit is for changing a display appearance for removing a selectability of the functionality for reducing distraction.

19. The system as claimed in claim 16 wherein the control unit is for:
filtering the surrounding indicator; and
factoring the surrounding indicator for improving a reliability for recognizing the driving environment.

20. The system as claimed in claim 16 wherein the control unit is for defining the environment category for categorizing the driving environment for identifying the driving environment to pay extra attention within the driving environment.

* * * * *